United States Patent [19]

Henk

[11] 4,428,249

[45] Jan. 31, 1984

[54] GEAR TORQUE SENSOR APPARATUS

[75] Inventor: Keith L. Henk, Brooklyn Park, Minn.

[73] Assignee: Pako Corporation, Minneapolis, Minn.

[21] Appl. No.: 327,520

[22] Filed: Dec. 4, 1981

[51] Int. Cl.³ .................... F16H 1/02; F16H 57/00; F16D 11/00; F16D 23/00
[52] U.S. Cl. ............................ 74/412 TA; 74/405; 74/337; 192/30 W; 192/20; 192/56 R; 192/150
[58] Field of Search ............ 192/56 R, 150, 20, 30 W; 74/412 TA, 412 R, 405, 406, 416, 400, 337

[56] References Cited

U.S. PATENT DOCUMENTS

| | | | |
|---|---|---|---|
| 2,621,678 | 12/1952 | Snyder et al. | 192/56 R |
| 2,658,399 | 11/1953 | Mercier | 74/412 TA |
| 2,945,925 | 7/1960 | Gessell | 192/150 |
| 3,411,612 | 11/1968 | Richmond | 192/150 |
| 3,563,353 | 2/1971 | LoPresti | 74/412 TA |
| 3,675,749 | 7/1972 | Olson | 192/56 R |
| 3,782,658 | 1/1974 | Mischenko | 74/405 |
| 3,935,754 | 2/1976 | Comollo | 74/412 TA |
| 4,373,924 | 2/1983 | Schuhmacher | 192/56 R |

FOREIGN PATENT DOCUMENTS

| | | | |
|---|---|---|---|
| 472568 | 1/1929 | Fed. Rep. of Germany | 192/56 R |
| 590528 | 1/1978 | U.S.S.R. | 192/56 R |

OTHER PUBLICATIONS

"Axial Motion of Splined Worm Gear Provide Torque Limiting Cut" *Design News*, Apr. 14, 1958.

*Primary Examiner*—Lawrence J. Staab
*Assistant Examiner*—Michael D. Bednarek
*Attorney, Agent, or Firm*—Kinney, Lange, Braddock, Westman & Fairbairn

[57] ABSTRACT

In a processor of photosensitive material, a torque sensor actuates an alarm when a helical gear is subjected to torque in excess of a first predetermined value. The torque sensor includes a helical gear positioned on a shaft and biased against a stop. The gear is slidably attached to the shaft along the axis of the shaft and is fixedly attached to the shaft in an angular direction by a key. A shoulder of a flexible rubber boot movable with the gear along the shaft axis moves with the gear when the torque exceeds the first predetermined value and actuates a switch to warn the operator. In addition, as the torque increases, the gear slidably moves along the shaft past the key, thereby allowing the shaft to freely rotate in an angular direction within the gear.

15 Claims, 7 Drawing Figures

GEAR TORQUE SENSOR APPARATUS

BACKGROUND OF THE INVENTION

1. Field of the Invention

The present invention relates to sensing of torque in a drive system of a processor of photosensitive material.

2. Description of the Prior Art

In photofinishing, it is typical to continuously process long webs of photosensitive material by transporting the web through a series of processing tanks which contain different chemical solutions, and then through a dryer that dries the web. Both photographic film and photographic print paper are commonly processed in this manner.

In the case of photographic film, it is typical to splice together individual strips of undeveloped photographic film for processing. Cine processor machines are used to develop continuously a long web of photographic film formed by splicing together individual strips of film.

In a cine processor, the film web is transported through the tank by sets of transport rollers. Typically, each tank has a transport rack with an upper and lower shaft on which are mounted a plurality of transport rollers. The lower shafts on which the transport rollers are mounted are driven through a gear train by the cine processor drive system. The film web enters a transport rack on one side, and is transported in a helical manner between the upper and lower rollers of the rack until it reaches the outside of the rack where it is transferred to the next transport rack.

As is easily apparent, any malfunction in the processor drive system results in costly down time and possible damage to the photosensitive web. An important component of the drive system is the gears that transfer the power from a main drive shaft to the transport rollers of appropriate shafts of the transport rack. Typically, there is a lower pair of cooperating gears that are submerged in the tank solution and an upper gear not in the tank solution cooperating with a main drive shaft gear. These gears are often made of plastic since they have to be resistant to chemical attack from the various chemical solutions used in the processor.

The main drive shaft gear which transfers power from the main drive shaft to the plastic gears cannot be made of a similar plastic as analogous plastics tend to adhere under load, causing accelerated wear and binding. Typically, the gears on the main drive shaft are made of stainless steel to avoid such binding. However, both cooperating gears that are completely submerged in the solution are made of plastic and do not bind since the solution acts as a buffer.

As the cine processor is used over a considerable amount of time, torque tends to develop in the drive system to a point where the weaker components, such as the plastic gears, are endangered. The torque develops from several sources. First, the bearings in the transport rollers tend to wear out. Second, the web from time to time wraps around the elements in the tank during a break. Third, many of the parts of the transport rack are made of plastic and may tend to swell and bind after considerable time in the various tank solutions causing torque to develop. If the torque problem is not corrected in time, a breakdown of the processor drive system will occur resulting in costly downtime and maintenance.

SUMMARY OF THE INVENTION

The present invention includes an improved torque sensor for a drive system of a processor of photosensitive material. The improved torque sensor includes a helical gear slidable axially along a shaft and fixedly attached to the shaft in an angular direction. The gear is biased against a stop by a first bias means producing a first biasing force in a first axial direction. When a sufficient amount of torque resisting rotation of the gear develops to overcome the first biasing force, the gear slidably moves a first predetermined distance against the first biasing force and actuates an alarm, thereby warning the operator that the torque within the drive system has exceeded the first predetermined value.

In addition, the torque sensor includes a second bias means cooperating with the first bias means to produce a second biasing force greater than the first biasing force. The second biasing force prevents the gear from axially sliding until the torque exceeds the second biasing force and then allows the gear to slide along the shaft to a point where the gear is free from its fixed angular attachment to the shaft. This allows the shaft to rotate freely and thus prevents damage to the drive system of the processor.

DETAILED DESCRIPTION OF THE PREFERRED EMBODIMENTS

Figure 1:
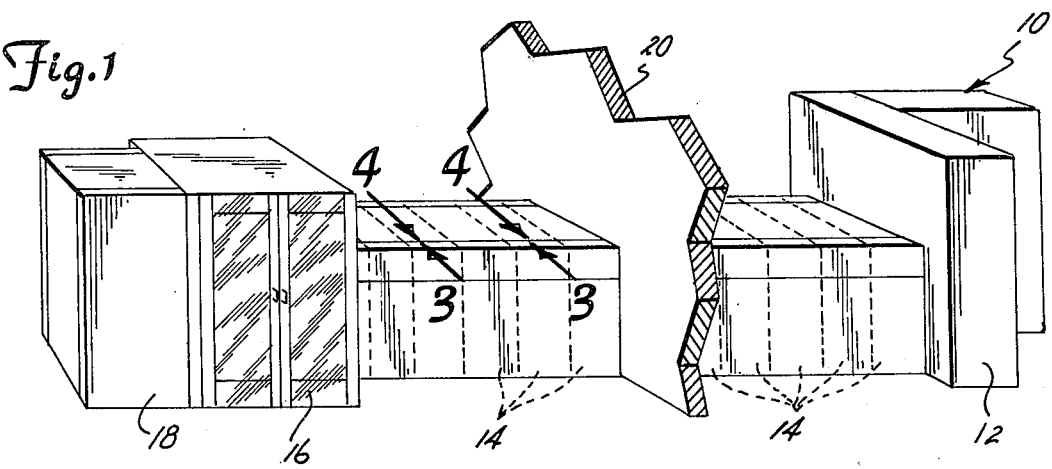
FIG. 1 is a perspective view of a cine processor.

FIG. 1 shows a typical cine processor, generally indicated at 10, for continuous processing of webs of photographic film. Photographic film is transported from a loader accumulator assembly 12, through a plurality of modular processing tanks 14, through a film dryer 16 and then to a take-up assembly 18. A wall 20 divides the modular processing tanks 14 for processing photographic film such that the film is processed in the absence of natural light through some of the tanks 14.

The processing tanks 14 have various chemicals which process the photographic film. A photographic film 34 is transported through the various tanks 14 by transport racks 22, one being illustrated in FIG. 2. The transport racks have upper and lower transport rollers 24, 26 that transport the photographic film 34 through the various tanks 14. The photographic film 34 engages each individual roller, starting with the first upper roller 24 of a first set of upper rollers 25 and then is threaded onto a second lower roller 26 of a second set of lower rollers 27. The film is then threaded upwardly to a second upper roller adjacent to the first upper roller 24 initially engaged by the film and then to a second lower roller 26 until the entire rack is threaded in a helical fashion.

Preferably, the lower transport rollers 26 provide the driving force that transports the film 34 through the racks in the various tanks. This force is provided by a drive system, portions of which are generally indicated at 28 in FIGS. 2 and 3. The drive system includes a main drive shaft 30 which provides power from a power source (not shown) to the transport rack 22.

Power is transferred by an upper set of helical gears 32, 36 with the gear 32 being fixedly attached to the main drive shaft 30 and the gear 36 being fixedly attached to an upper end of a substantially vertical shaft 38 that is rotatably held within a frame member 40 of the transport rack 22. At the lower end of the substantially vertical shaft 38, a second set of gears 42, 44 shown as miter gears, cooperate to further transfer power. The miter gear 42 is fixedly attached to the lower end of the vertical shaft 38 and the miter gear 44 is fixedly attached to one end of a drive roller 46 which engages the outer edges of transport rollers 26, driving the transport rollers 26 and moving the film through the racks 22 and through the tanks 14.

The gears 36, 42, 44 are typically made of plastic for resistance to the various chemicals found in the various tanks 14. The gear 32 is not made of plastic since it has been found that cooperation between similar plastic gears over a considerable length of time will cause them to bind. The lower gears 42, 44, however, can be made of the same plastic since they have substantially less sliding contact than the helical gears, and are also submerged in a chemical solution which acts as a buffer and heat sink preventing binding of the gears over time.

As can be seen from the above description, maintenance on the gears, especially the lower gears 42, 44 is difficult and quite expensive. One source of potential problem is excessive torque buildup in the drive system. Torque can be developed from several sources. First, the bearings in the transport rollers 24, 26 that transport the film 34 through the tanks 14 may wear out. Second, the film 34 can get wrapped around elements in the tank during a film break. Third, some of the plastic parts of the drive system, such as the drive roller 46, may tend to swell after being submerged for a considerable amount of time in the various chemical solutions in the tanks.

Figure 3:
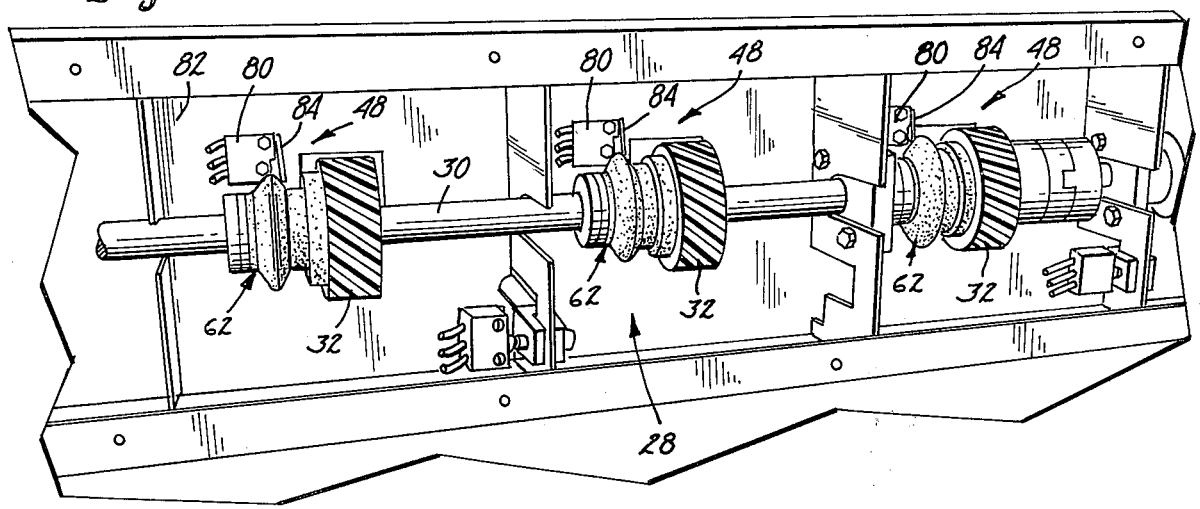
FIG. 3 is a fragmentary perspective view of a plurality of torque sensors of the present invention in the drive system of a cine processor taken along the line 3—3 in FIG. 1.
Figure 4:
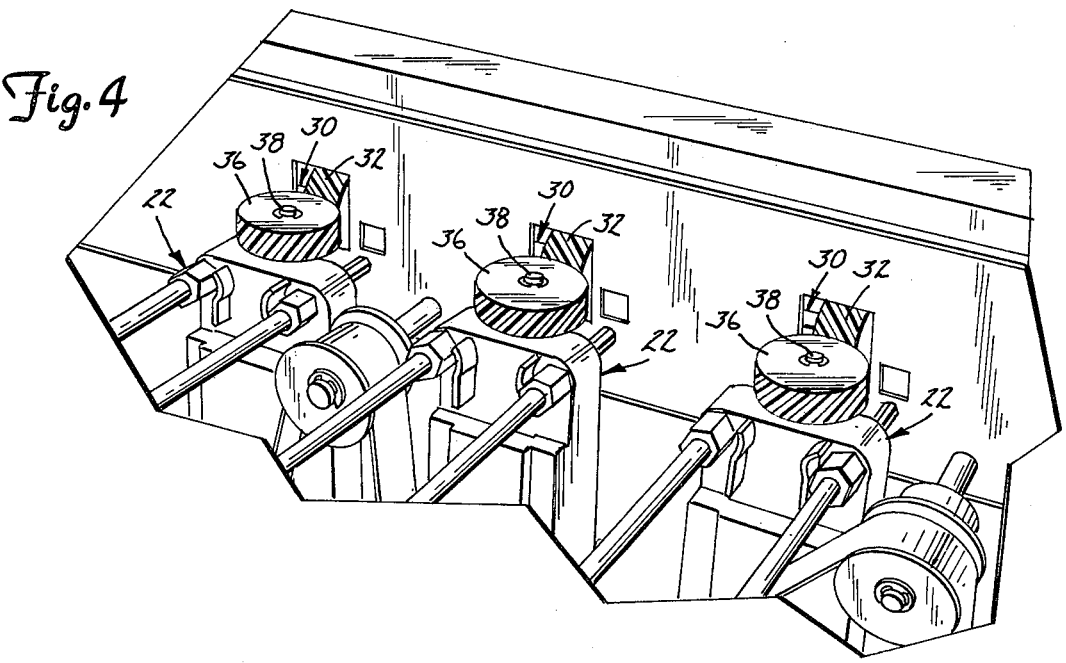
FIG. 4 is a fragmentary perspective view of a plurality of transport racks connected to the drive system of a cine processor taken along the line 4—4 in FIG. 1.
Figure 2:
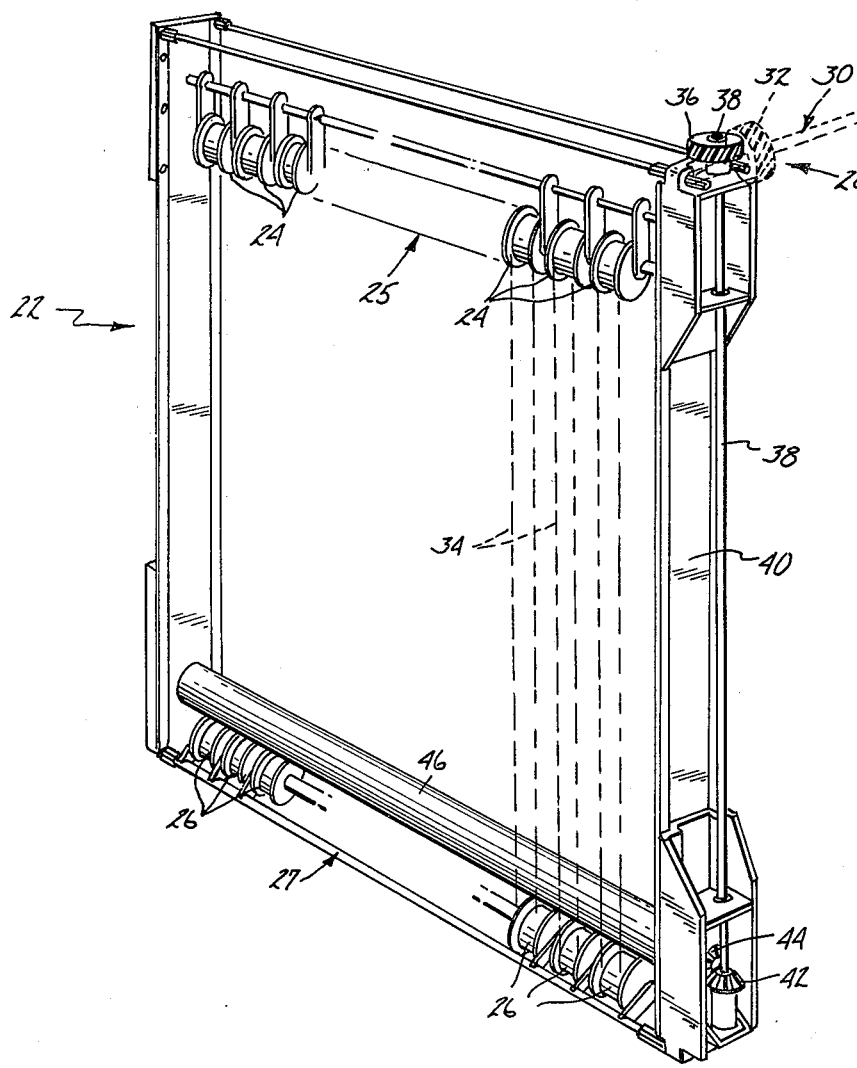
FIG. 2 is a perspective view of a film transport rack used in a cine processor.
Figure 5:
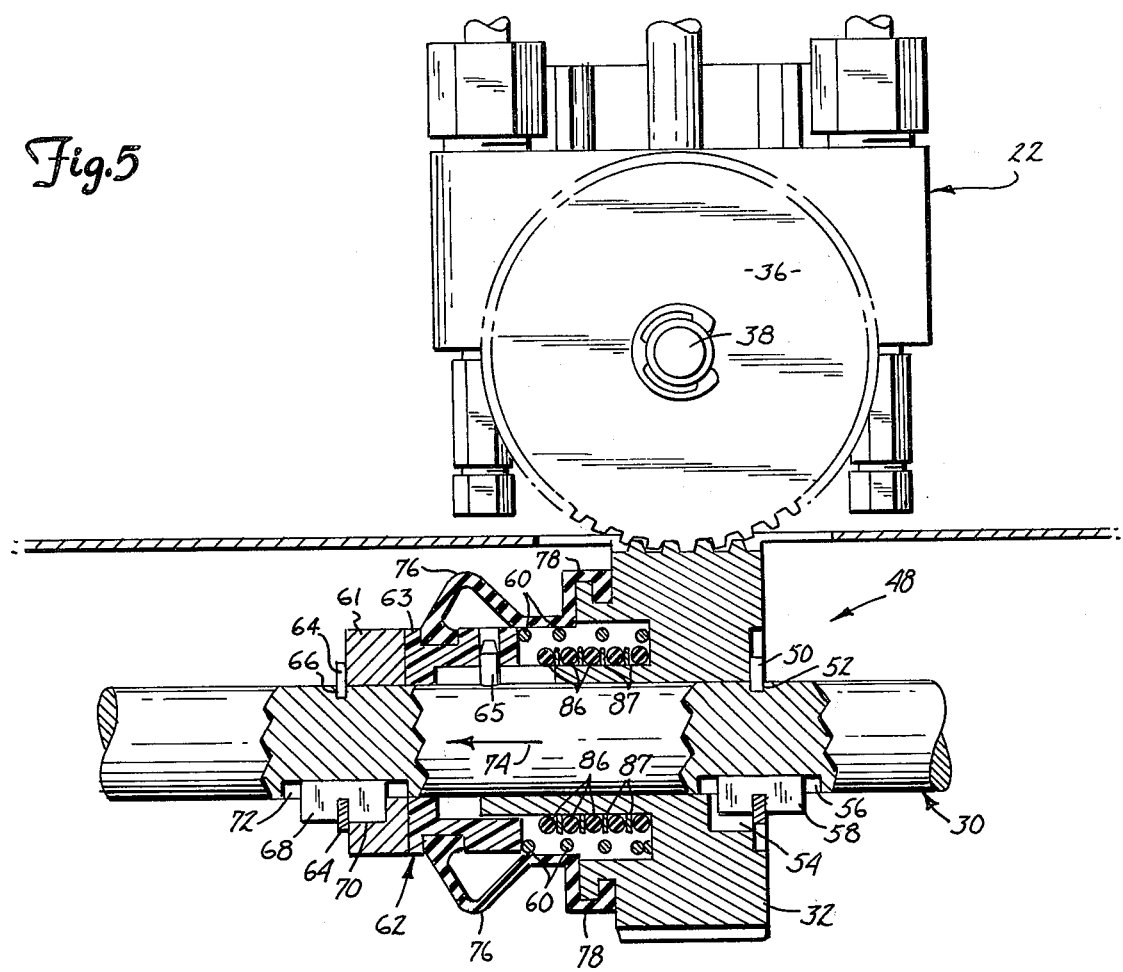
FIG. 5 is a cross sectional view of a rack torque sensor of the present invention with portions shown whole for purposes of clarity.

The torque sensor system of the present invention senses when an excessive amount of torque has developed in the drive system and warns the operator of the build-up. In addition, further torque build-up will free the gear from engagement with the drive shaft 30 eliminating damage to the drive system. A plurality of torque sensors forming a torque sensing system is generally indicated at 48 in FIG. 3 with a single torque sensor shown in greater detail in FIGS. 5 through 7. The torque sensors 48 operate independently of each other, each positioned to sense excess torque development in each individual rack 22 through cooperation of the gears 32 and 36, as illustrated in FIGS. 2 through 4.

The torque sensor 48 includes the gear 32 positioned on the shaft 30. The gear 32 and the gear 36 have helical teeth that form approximately a 45° angle with their rotational plane. The cooperation of the teeth of the gears 32 and 36 will produce a force vector approximately perpendicular to and to the left of the rotation of the gear 32. On the right, the gear 32 is biased against a stop, preferably, a first retaining ring 50 (FIG. 5) that is attached to the shaft 30 within a slot 52. The gear 32 also has a keyway 54 that corresponds to a keyway 56 in the shaft 30. A key 58 is received within both keyways 54, 56 and retains the gear 32 in a fixed angular position with respect to the shaft 30. The key 58 is preferably held in place by the first retaining ring 50.

The gear 32 is biased against the first retaining ring 50 by a first bias means such as spring 60, preferably a coil spring, which abuts against the gear 32 at one end and a rear stop member 62 at the other end. The rear stop member 62 is fixedly held along a longitudinal axis of the shaft 30 by a thrust collar 61 and retaining ring 64. The second retaining ring 64 engages a slot 66 on the shaft 30. A key 68 is held by the retaining ring 64 within a keyway 70 positioned in the thrust collar 61 cooperating with a keyway 72 positioned within the shaft 30.

The coil spring 60 provides a biasing force biasing the gear 32 against the retaining ring 50 until the torque in the drive system 28 exceeds a first predetermined value. The first predetermined value is preferably in the approximate range of 5 to 7 lb.-in. When the torque exceeds the first predetermined value, the gear 32 slides in a direction of arrow 74 (FIG. 7) along the shaft 30 due to the helical configuration of the gears 32 and 36.

A flexible rubber boot 76 is fixedly attached to the stop member 62 at one end and is fixedly attached to the gear 32 at another end. The boot 76 has a shoulder 78 proximate the gear 32 with the shoulder 78 moving in the direction of arrow 74 along with the gear when the torque exceeds the biasing force of the spring 60.

Figure 6:
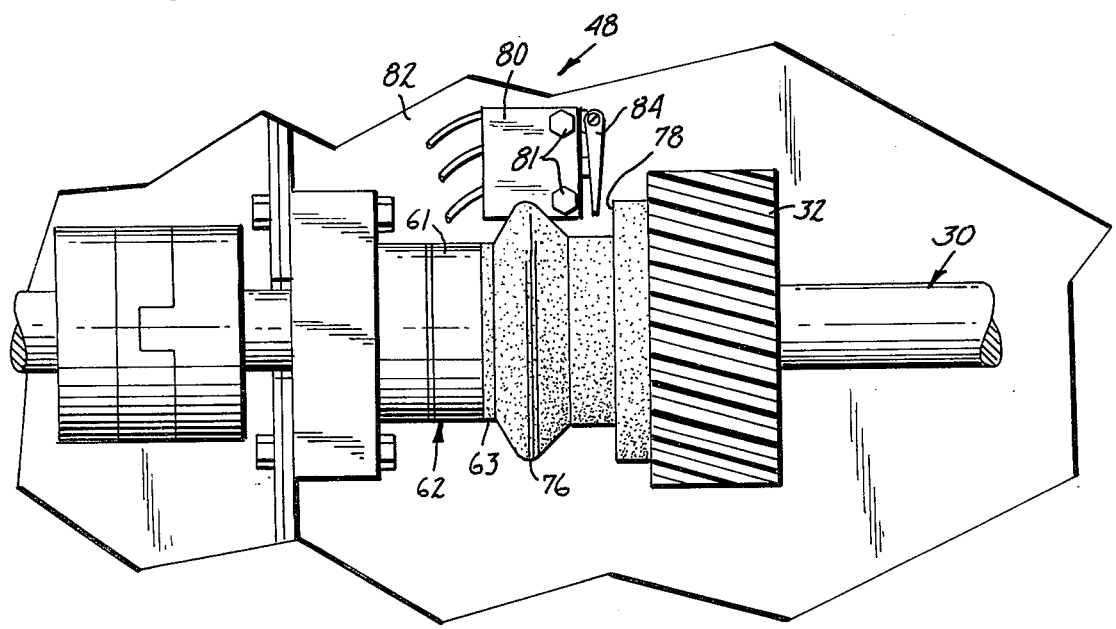
FIG. 6 is an enlarged front view of one of the rack torque sensors shown in FIG. 3.

As best shown in FIGS. 3 and 6, a switch 80, preferably a microswitch, is firmly mounted by a pair of screws 81 onto a fixed portion 82 of the processor. The switch 80 has a lever arm 84 which actuates the switch. The lever arm 84 is positioned such that the shoulder 78 and the gear 32 need to move approximately ⅛ of an inch to move the lever arm 84 and actuate the switch 80. The switch 80 in turn activates an alarm to notify the operator that an excessive amount of torque has developed in the drive system.

A second bias means, preferably a plurality of rubber o-rings 86, is positioned within the coil spring 60 between the stop member 62 and the gear 32. The o-rings 86 are positioned about the shaft 30 with a metal spacer 87 separating the o-rings 86 from each other. Although five o-rings are shown in the Figures, the number of o-rings may vary according to the particular o-ring material used and the biasing force required. The rubber o-rings 86 along with the spring 60 provide a second bias force of a second predetermined value that bias the gear 32 in a direction opposite arrow 74 when the gear 32 has moved along the shaft 30 compressing the spring 60 until both the stop member 62 and the gear 32 contact the o-rings 86. Preferably, the second predetermined value is in the approximate range of 50 to 75 lbs.-in.

Figure 7:
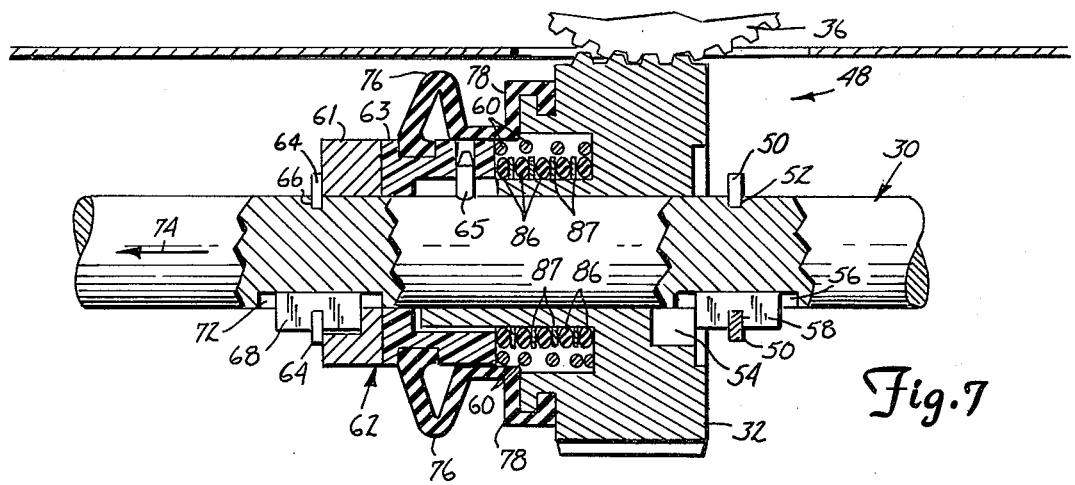
FIG. 7 is a cross sectional view of the rack torque sensor reacting to an excessive amount of torque with portions shown whole for purposes of clarity.

When the torque builds to the second predetermined value, the gear 32 will move in a direction of arrow 74 and will compress the o-rings 86, as illustrated in FIG. 7. Preferably, when the gear moves a distance of approximately ⅛ of an inch in compressing the o-rings 86, the gear keyway 54 will move past a point of cooperation with the shaft key 58 and permit the gear 32 to remain stationary while the drive shaft 30 continues to rotate. This provision acts as a safety release to prevent a certainty of damage to the gears. At a release point over ten times normal torque levels, the mechanism reliably prevents unwarranted disengagement, as a premature release would be potentially harmful to the film. It is assumed that at an extraordinary level of torque (more than ten times normal operating levels), serious binding has occurred and mechanical damage that will cause harm to the film and prolonged downtime is imminent. Proper release will prevent serious and extensive mechanical damage to the processor when serious mechanical damage is otherwise certain. As long as the torque exceeds the biasing force of the coil spring 60 and the o-rings 86, the gear 32 will stay in a position of disengagement from the key 58 and not transfer any power from the processor drive system 28 to the transport rack 22, thereby preventing damage to the gears 36, 42 and 44.

CONCLUSION

The present invention provides an initial warning to the operator of a processor of photosensitive material informing the operator that an excessive amount of torque has developed in the drive system. In addition, if the initial warning is ignored or if the operator is busy and the torque continues to develop to a level that could cause possible damage to parts of the drive system, the torque sensor of the present invention allows the gear to stop, thereby preventing damage to the drive system.

Although the present invention has been described with reference to preferred embodiments, workers skilled in the art will recognize that changes may be made in form and detail without departing from the spirit and scope of the present invention.

What is claimed is:

1. In a drive system of a processor of photosensitive material, the improvement comprising:
   a shaft;
   stop means positioned on the shaft;
   a gear having helical teeth and slidably axially positioned on the shaft and fixedly attached to the shaft in an angular direction;
   first bias means for biasing the gear in a first axial direction toward the stop means with a first biasing force;
   means for actuating an alarm when a sufficient amount of torque resisting rotation of the gear develops to overcome the first biasing force, and the gear slidably moves a first predetermined distance in a second opposite axial direction;
   second bias means for biasing the gear in the first axial direction and in combination with the first bias means providing a second biasing force greater than the first biasing force; and
   means for permitting the gear to rotate freely in the angular direction when the torque exceeds the second biasing force and the gear has moved a second predetermined distance in the second axial direction.

2. The invention of claim 1 wherein the means for permitting the gear to rotate freely includes a first keyway disposed on the gear and a second keyway disposed on the shaft, the gear positioned on the shaft so that the first and second keyways cooperate, and a key positioned in both the first and second keyways to hold the gear in a fixed angular direction with respect to the shaft while permitting the gear to slidably move in the axial direction and permitting the gear to rotate freely when the gear has moved the second predetermined distance.

3. The invention of claim 1 wherein the first bias means is a coil spring.

4. The invention of claim 1 wherein the second bias means includes a plurality of rubber o-rings in combination with the coil springs.

5. The invention of claim 1 wherein the gear slidably moves approximately an additional one-eighth of an inch against the second bias means before permitting the shaft to rotate freely.

6. The invention of claim 1 wherein approximately 50 to 75 lbs.-in. of torque will overcome a biasing force of the second bias means.

7. The invention of claim 1 wherein the gear and the means for actuating the switch means move approximately one-eighth of an inch against the first bias means before engaging the switch means.

8. The invention of claim 1 wherein approximately 5 to 7 lbs.-in. of torque will overcome the first biasing force of the first bias means.

9. The invention of claim 1 wherein the helical teeth form approximately a 45° angle with a rotational plane of the gear.

10. The invention of claim 1 wherein the means for actuating an alarm includes a switch having a pivoting lever arm positioned to be engaged when the gear has moved a predetermined distance in the axial direction.

11. The invention of claim 10 wherein the means for actuating the switch means includes a rubber boot covering the first bias means having a shoulder portion proximate the gear such that the shoulder portion engages the pivoting lever arm and actuates the microswitch.

12. In a drive system of a processor of photosensitive material, a torque sensing system comprising:
   a main drive shaft; a plurality of stops positioned on the drive shaft;
   a plurality of first gears, each first gear having helical teeth and slidably positioned in an axial direction on the drive shaft against a stop and fixedly attached to the drive shaft in an angular direction;
   a plurality of second gears having helical teeth, each second gear cooperating with and driven by one of the first gears;
   first bias means for biasing each first gear in the axial direction toward the stop with a first biasing force;
   switch means for actuating an alarm when a sufficient amount of torque develops at any first gear to overcome the first biasing force through cooperation with a second gear, said first gear slidably moves in the axial direction against the first bias means to actuate the switch means;
   second bias means for biasing the first gear in the same axial direction as the first bias means and in combination with the first bias means providing a second biasing force greater than the first biasing force; and
   means for permitting the drive shaft to rotate freely when the torque exceeds the second biasing force.

13. In a drive system of a processor of photosensitive material, the improvement comprising:
   a drive shaft; stop means positioned on the drive shaft;
   a first helical gear having helical teeth slidably positioned on the drive shaft;
   means for mounting the first gear on the drive shaft to permit axial movement of the gear on the shaft while maintaining the first gear in a fixed position with respect to the shaft in an angular direction;

first bias means for biasing the first gear in a first axial direction toward the stop means with a first biasing force;

a second shaft;

a second helical gear having helical teeth mounted on the second shaft and cooperating with the first gear so that drive power from the drive shaft is transferred through the first and second gears to the second shaft;

means for actuating an alarm when a sufficient amount of torque resisting rotation of the second gear develops and is transmitted to the first gear to overcome the first biasing force so that the first gear slidably moves a first predetermined distance in a second opposite axial direction;

second bias means for biasing the first gear in the first axial direction for providing a second biasing force greater than the first biasing force; and wherein the mounting means permits the drive shaft to rotate freely when the torque exceeds the second biasing force.

14. In a drive system of a processor of photosensitive material having a main drive shaft, a plurality of first gears mounted on the main drive shaft, a plurality of second shafts; a plurality of second gears mounted on the second shaft in cooperating with the first gears to transfer drive power from the main drive shaft to the plurality of drive shafts; the improvement comprising:

torque sensing means for actuating an alarm when a sufficient amount of torque develops resisting rotation of any second gear by its cooperating first gear wherein the torque resisting rotation of each second gear is sensed by an individual torque sensing device, each torque sensing device including:

a key secured to the main drive shaft slidably engaging the second gear and fixedly securing the second gear in an angular direction;

a stop fixedly attached to the main drive shaft;

first bias means for biasing the second gear with a first biasing force against the stop and opposing the torque resisting rotation of the second gear;

means for sensing movement of the second gear when the torque resisting rotation exceeds the first bias force; and second bias means for biasing the second gear in the same direction as the first bias means and in combination with the first bias means providing a second biasing force greater than the first biasing force such that when the torque resisting rotation exceeds the second biasing force, the second gear moves out of engagement with the key and the main drive shaft freely rotates.

15. The system of claim 14 wherein the first and second gears have helical teeth.

* * * * *